United States Patent [19]

Jarleton et al.

[11] 4,091,268

[45] May 23, 1978

[54] SYSTEM FOR PROCESSING MAIL USING DOCUMENTS OF DIVERSE FORMATS OR TYPES

[75] Inventors: Paul Jarleton, Fontenay sous Bois; Marcel Tollet, Paris, both of France

[73] Assignee: Societe pour l'Affranchissement et le Timbrage Automatoques S.A., Clichy, France

[21] Appl. No.: 678,423

[22] Filed: Apr. 19, 1976

[30] Foreign Application Priority Data

Apr. 23, 1975 France ................................ 75 12637

[51] Int. Cl.[2] .......................... G06K 17/00; B65B 3/04

[52] U.S. Cl. .................................. 235/424; 53/266 A

[58] Field of Search ..................... 235/61.7 R, 61.7 B, 235/61.6 R; 209/110, 110.5; 53/266 A

[56] References Cited

U.S. PATENT DOCUMENTS 3,418,455 12/1968 Rackliffe et al. ............... 235/61.7 R

*Primary Examiner*—Daryl W. Cook

*Attorney, Agent, or Firm*—Haseltine, Lake & Waters

[57] ABSTRACT

Method for processing mail enabling the mechanization of the folding of non-standardized documents. The method comprises fixing to the non-standardized document a support sheet whose format is standardized, bearing the address printed by a memory storing all the data relating to customers bearing code numbers.

4 Claims, 1 Drawing Figure

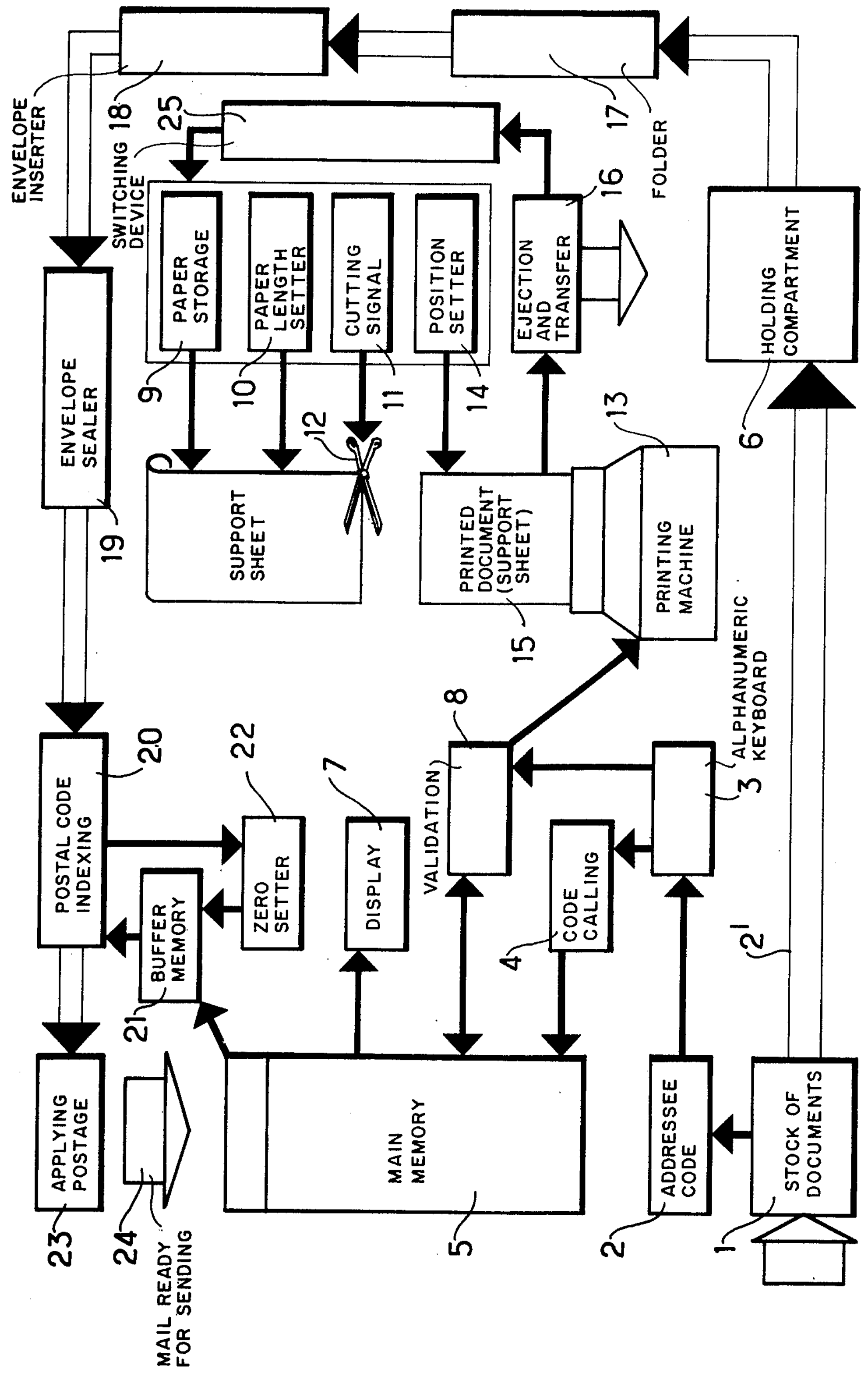
ENVELOPE INSERTER
18
25
SWITCHING DEVICE
17
FOLDER
16
PAPER STORAGE
PAPER LENGTH SETTER
CUTTING SIGNAL
POSITION SETTER
EJECTION AND TRANSFER
HOLDING COMPARTMENT
ENVELOPE SEALER
9
10
11
12
14
13
6
SUPPORT SHEET
PRINTED DOCUMENT (SUPPORT SHEET)
PRINTING MACHINE
19
15
ALPHANUMERIC KEYBOARD
8
POSTAL CODE INDEXING
20
22
7
ZERO SETTER
DISPLAY
VALIDATION
3
CODE CALLING
BUFFER MEMORY
4
2'
21
APPLYING POSTAGE
MAIN MEMORY
ADDRESSEE CODE
STOCK OF DOCUMENTS
23
24
5
2
1
MAIL READY FOR SENDING

SYSTEM FOR PROCESSING MAIL USING DOCUMENTS OF DIVERSE FORMATS OR TYPES

FIELD OF THE INVENTION

The present invention relates to an automatic system for complete processing of mail, texts or documents intended to be sent in envelopes.

BACKGROUND

It is known that when it is required to process documents which are of a type not allowing the address to be written on it (format, quality of paper, paper already completely printed on, personalized document, etc...), it is impossible to use a window envelope.

Up till now, to send these documents, only a manual operation was possible, the documents being folded and inserted into a personalized envelope addressed to the addressee of the document.

SUMMARY OF THE INVENTION

The method according to the present invention overcomes that disadvantage. Indeed, that method enables the complete automation of the various operations.

The object of the present invention is to provide a method for processing mail using documents which can have various formats and comprising automatized phases as follows:

Folding of the documents;
Putting the documents into envelopes;
Sealing of the envelopes;
Indexing of the postal code;
Stamping;
characterized in that it comprises, previously to those phases, the interrogation of a main memory by means of an alphanumeric keyboard actuated by an operator, said memory addressing data which comprises at least the address of the addressee, to a printing machine which prints the said data on a support sheet already cut to standard dimensions, the said support sheet being connected to the documents to be folded at the same time, the whole being inserted automatically into a window envelope allowing the address of the addressee borne by the support sheet to appear.

The envelope containing the document can contingently bear the index of the postal code. The indexing is effected by means of a buffer memory receiving its data from the said main memory.

Likewise, the mail can be stamped automatically.

BRIEF DESCRIPTION OF THE DRAWING

An of embodiment of the present invention, given only by way of illustration and having no limiting character will be described with reference to the single FIGURE of the drawing, which shows, diagrammatically, the various operations effected for the processing of the mail.

DETAILED DESCRIPTION

As shown in the FIGURE, the bundle of documents to be sent is shown at 1. The bundle can comprise documents of all kinds and all formats. The operator takes a document, composes, on tha alphanumeric keyboard 3, a code 2 corresponding to the addressee (or other) of the document. The alphanumeric keyboard 3 causes the calling of the code number at 4 and the search in the main memory at 5. The memory 5 comprises a card index containing, for example, such information as addresses of correspondants, texts of letters, publicity forms or any other data addressed by a code number. The operator could also use the alphanumeric keyboard to complete, on the printing machine, the texts stored in the memory 5. Contingently and for checking purposes, the code number, the address of the addressee, etc... can be displayed 7 by the main memory 5. This operation is followed by a validation 8 effected from the alphanumeric keyboard 3.

The validation 8 enables the transfer, on the support 15, by means of the printing machine 13, of data stored in the memory at the requested code number. During the compiling of the document 15, the bundle 1 can effect a transfer (arrow 2') in the compartment 6 and be put in the waiting state. The support sheet or the document 15, being constituted, is then ejected and transferred automatically 16 towards the compartment 6 where it is put among the document or documents which are already placed therein.

The said automatic ejection and transfer 16 cause the tripping 25 of the following paper supplying cycle for the printing machine, that is, they cause the automatic and continuous unwinding, from a store of paper 9, the setting to length of the paper 10 and the automatic cutting of the paper 11 by a trimmer represented by the scissors 12. The sheet is cut to a dimension which can be adjustable for length. It is lowered, for example, by gravity, it is gripped by the rollers of the printing machine 13 and set in position 14 to form the following document.

The bringing together of the documents 1 and the support sheet 15 is then effected in the compartment 6. The folding 17 of the document or documents taken as a whole is effected in an existing folding machine, the folding being effected in compliance with the format of the support sheet 15 which is folded around the original document or documents. The same machine then effects the putting in the envelopes 18 and the sealing of the envelopes 19, the address of the addressee comes out in a good position in the window envelope. The envelopes used are of a constant format.

The automatic indexing 20 of the postal code which is borne on the envelope, could be effected subsequent to that automatic system. To effect that indexing, the main memory 5 sends out data to a buffer memory 21, the latter being used for tripping the composing of a postal index code. After each pass of a letter, the buffer memory is reset to zero at 22.

At the end of the system, the postal franking 23 can be effected by means of franking machines known to one skilled in the art.

At the output 24, the mail is then ready for sending. The method used enables non-mechanizable documents to be processed by fixing them onto a mechanizable support sheet of a single format using only one format of window envelope. The method used enables, moreover, the printing of a letter on the support sheet and the use of the device without the affixing of accompanying documents.

It will be understood that the system described hereinabove has no limiting character and that it could be used in a completely automatic manner, that is, by short-circuiting the keyboard by means of a selective programming system whose aim would be to question the memory, to trip the cycle, etc. Thus, a completely automatic system, forming one or several personalized documents and comprising the stamping of the mail, could be produced.

Applications come within the field of the processing of mail, from the forming and folding of the document, the putting into envelopes, and the postal indexing to the stamping .

What is claimed is:

1. In a method for processing mail containing documents which can have various formats and comprises the successive automated steps of:

folding the documents;

putting the documents into envelopes;

sealing the envelopes;

indexing a postal code on the envelopes and applying postage to the envelopes, the improvement comprising effecting prior to these steps the interrogation of a main memory by an alphanumeric keyboard actuated by an operator, said memory furnishing data which comprises at least the address of an addressee to a printing machine which prints said data on support sheets cut to standard dimensions, combining said support sheets with respective documents such that they are folded therewith, and inserting the folded assembly of a support sheet and a document automatically into a window envelope such that the address of the addressee borne by the support sheet appears in the window of the envelope.

2. A method according to claim 1 wherein the indexing of the postal code is effected by a buffer memory receiving data from the main memory.

3. A method according to claim 1 comprising supplying the printing machine with support sheets in the form of paper by automatic and continuous unwinding thereof from a stock of paper, setting the paper to length, cutting the paper automatically and putting the cut sheet of paper in position automatically to be folded around the respective document.

4. A method according to claim 1 comprising ejecting the printed support sheet from the printing machine for automatic transfer to the associated document.

* * * * *